United States Patent [19]

Daftary

[11] 3,971,856

[45] July 27, 1976

[54] PROCESS FOR PREPARING SOY PROTEIN CONCENTRATE

[75] Inventor: Rasik D. Daftary, Decatur, Ill.

[73] Assignee: Archer Daniels Midland Company, Decatur, Ill.

[22] Filed: Mar. 3, 1975

[21] Appl. No.: 554,572

[52] U.S. Cl............................ 426/417; 260/123.5; 426/431; 426/459
[51] Int. Cl.² ...................... A23J 1/14; A23J 3/00; A23L 1/20
[58] Field of Search.................... 426/417, 431, 459; 260/123.5

[56] References Cited
UNITED STATES PATENTS

| | | | |
|---|---|---|---|
| 3,594,184 | 7/1971 | Hawley et al. | 426/431 X |
| 3,635,726 | 1/1972 | Sair | 426/431 X |
| 3,876,807 | 4/1975 | Wagner et al. | 426/431 X |

*Primary Examiner*—James R. Hoffman
*Attorney, Agent, or Firm*—Plumley and Tyner

[57] ABSTRACT

Process for preparing a full-fat soy protein concentrate having a bland taste and light color and substantially all of its original protein and fat by subjecting dehulled, cracked soybeans to water at 180°F to 212°F, removing the beans from the water, washing the beans in fresh water, and drying to 8–15% moisture. The product is useful as a human or animal food or it may be subjected to further processing to remove the oil to produce a defatted soy protein concentrate useful in preparing a variety of foods.

5 Claims, No Drawings

PROCESS FOR PREPARING SOY PROTEIN CONCENTRATE

This invention relates to a process for preparing a bland, colorless soy protein concentrate, and more particularly, it relates to such a process involving the cooking of the beans in boiling water without the loss of any significant amount of the protein.

In the last few years, soybeans have been recognized as a valuable food product because of the very high content of protein containing nearly all of the essential amino acids. Furthermore, the soybeans contain a large amount of oil which in the past has been a valuable component for various resins, paints, varnishes, etc. One of the principal obstacles to a widespread use of soybeans as a human food has been the fact that the bean does not have an appealing taste and is not completely digestible unless it is treated in such a fashion as to deactivate certain enzymes and anti-nutritional factors, e.g. trypsin inhibitor. It is known that if the beans are heated by a process called "toasting" the subsequent production of a bad taste in the beans is inhibited but the product has a toasted flavor as well as a brownish color. In most processes in the past, this has been accomplished on a bean that has been defatted by a process of crushing and removing the oil, normally including a solvent extraction treatment, and thereafter treating the defatted product to a heating or toasting process in order to produce a product that contains a large concentration of useable protein. In more recent times, it has become recognized that the oil is a valuable component of a human food product and that if the bean could be treated to prevent any development of bad taste and yet retain all of the protein and oil a highly nutritious food product would be obtained. One such process is described and claimed in my copending application Ser. No. 345,969 filed Apr. 2, 1973, wherein the soybean is soaked in a mixture of aliphatic alcohol and water at ordinary temperatures for several hours and the resulting product has a bland flavor, a light color, and substantially all of the original oil and protein. Although the protein in the soybean is water-soluble and the oil in the soybean is alcohol-soluble, the process of this copending application is able to treat the soybean without dissolving more than an insignificant amount of either of the protein or of the oil.

The present process is intended to produce substantially the same result as that of my copending application mentioned above by a process which is much more rapid and much less expensive. This is accomplished with a loss in water solubility of the protein but for many purposes that property is not essential. Protein in its natural form is water-soluble and able to mix well with other materials but if that protein is subjected to heat, changes in pH, or the like, it loses its water-solubility and its capability of mixing with other materials. This change in water solubility is frequently spoken of as a change in one of the "functionality" properties of the protein. The process of my copending application does not change the "functionality" of the protein to any substantial extent. Nevertheless, the present process is a much more efficient and simple operation and, therefore, would be desirable in certain commercial applications.

It is an object of this invention to provide a simple process for preparing a full-fat soy protein concentrate with a bland taste and a light color. It is another object of this invention to provide a process for preparing full-fat soy protein concentrate by boiling soybeans in water without adjustable loss of protein or oil. It is another object of this invention to provide a means of destroying enzymes which produce off-flavors without producing any darkening in the color of soybean material. It is another object of this invention to treat soybeans in such a manner as to destroy the anti-nutritional factors, such as trypsin inhibitor, and to remove flatulence producing factors, such as stachyose, raffinose, etc. It is still another object of this invention to provide a process for producing a full-fat soy protein concentrate having all of the improved properties mentioned above, and which can thereafter be subjected to conventional defatting operations to produce a soy protein concentrate having at least 70% protein a moisture-free basis and substantially no oil. It is yet another object to provide a means for producing soy protein with different amounts of oil ranging from the full-fat product to the defatted product. Still another objects will be apparent to those skilled in the art upon studying this disclosure.

The foregoing objects are accomplished by a process for preparing a full-fat soy protein concentrate which is very bland in taste and very light in color and contains substantially all of the original protein concent which comprises the sequential steps of:

1. adding dehulled, cracked soybeans to water at 180°–212°F, and maintaining that temperature for 10–50 minutes,
2. removing the soybeans from the water,
3. washing the soybeans in fresh hot water, and,
4. drying the washed soybeans to any desired moisture content, preferably 8–15% moisture.

In preferred embodiments of this invention, the soybeans are boiled for 15–40 minutes and the final full-fat soy protein concentrate contains 26–27% fat and 51–52% protein on a moisture-free basis and more than 90% of the trypsin inhibitor is destroyed. In another embodiment of this process the full-fat soy protein concentrate is subjected to a falking or grinding operation followed by a conventional defatting process to produce a soy protein concentrate having at least 50% protein on a moisture-free basis and whatever oil content is desired, down to one containing substantially no fat, and having at least 70% protein.

Because soy protein is soluble in water, it has been accepted by those skilled in this art that if soybeans are subjected to water, at normal temperatures or at boiling temperatures, there would be significant losses of protein and probably there would be losses of oil because of the emulsion that might be produced with the soluble proteins. In the course of the research leading up to the present invention, it was found that the losses of proteins and oil varied with the type of starting material employed. If the hull-enclosed whole soybean is used, there is the least amount of protein and oil loss. If full-fat soybean flakes are used, the losses of proteins and oils are very high and the product has an unpleasant color. When dehulled, cracked soybeans are employed, there is some loss of proteins and oil, but the loss is very small. If the only matter of concern were to recover as much protein and as much oil as possible, one would therefore use the whole soybean (hull-enclosed) but the difficulties encountered in removing the hull from the bean after it has been subjected to this treatment of boiling water are too great to employ this type of starting material. The water soaked hulls to not easily separate from the rest of the bean and as a result this separation process becomes very expensive. Furthermore, treatment of the whole soybean to obtain a 70% protein (moisture-free basis) requires uneconomically long boiling periods to leach out the non-protein and non-oil materials which must be removed in order to reach such a concentration of protein.

The use of soybeans as human food has never been widely accepted because of the undesirable taste associated with the bean. This taste has been described as "beany" or "green" or "grassy", but whatever the description may be, the taste has not been acceptable to the large majority of the human consumers outside of the Orient. It has been known for sometime that soybeans contain certain enzymes which have been thought to be the source of the bad taste or off-flavor. Although it has not been established beyond doubt, it is believed to be true that the natural bean before treatment of any kind does not have any off-flavor even though it does contain the enzymes known to be present. It is believed that as soon as moisture comes in contact with the enzymes, an instant reaction occurs which produces the off-flavor. It has been known that if the soybean is subjected to heat, the production of off-flavor is inhibited or it is masked by the toasting which occurs, and accordingly, there has been a widespread practice in the treatment of soybean materials to employ the "toasting" operation. This is nothing other than a heating operation with dry steam which results in a toasted flavor as well as a toasted color not unlike that found in the toasting of bread. In other words, the bean after toasting has a slightly brownish color and a slightly scorched taste which masks the beany off-flavor normally encountered with this product. The toasting operation has been accepted in this industry as a compromise process because products with less flavor and less color were not available.

In addition to the many other desirable properties mentioned above, the process of the present invention provides a significant improvement in the color and the flavor of soybean materials. It is believed that this occurs because the process provides sufficient heat to deactivate the natural enzymes in the bean before they can act to produce off-flavor and at the same time the heat is not so high as to produce the toasted color. It has been found that if the beans are placed in water at temperatures much below the boiling point and the heat is applied to raise the temperature of the water to boiling, there is sufficient time for the enzymes to act and to produce off-flavor before they are deactivated. Accordingly, it is a critical matter in this process to add the beans to water which is at least at 180°F, and preferably already boiling, so that the most rapid heat transfer can take place to deactivate the enzymes as quickly as possible. The boiling temperature of water is sufficiently low that toasting does not occur and so there is no production of off-color. It is somewhat surprising to find that the enzymes are deactivated without the production of off-flavor because it is known that the enzymes function in this manner in the presence of water. Apparently the heat from the hot water penetrates to the internal portions of the bean to destroy and deactivate the enzyme before the water can penetrate to be in contact with the enzyme. Whatever may be the scientific explanation, it is known that when the beans are placed in water at 180°F–212°F, and maintained at that temperature, the off-flavors and off-colors are eliminated, the anti-nutritional factors are destroyed, the flatulence-producing factors are leached out, and the product is a full-fat soy protein concentrate.

The time of heating is important only because there is a minimum period necessary to deactivate the enzymes, destroy the anti-nutritional factors and remove most of the flatulence-producing factors. The exact minimum amount of time depends on a variety of factors such as the heating temperature, the size of the bean, its age and condition due to its prior history of atmospheric conditions while growing and subsequent storage conditions, and the functional characteristics which are desired in the final product. Generally, it has been found that the boiling should take place for at least 10 minutes and preferably for at least 15 minutes. At lower temperatures longer times are required. The maximum time is not critical and is determined principally by economic and efficiency considerations. Times longer than about 40–50 minutes are believed to be unnecessary regardless of the size of the dehulled, cracked bean, its age and physical condition, or the functionality desired. Within 40–50 minutes at the above temperatures, the water solubility of the protein will be at its lowest point, the enzymes will be completely deactivated, the anti-nutritional factors will be destroyed, and the flatulence-producing factors will be leached out, and accordingly, further treatment produces no additional benefits.

Atmospheric pressure conditions are preferred, although lower pressures or higher pressures can be employed if the proper temperatures are employed. A minimum temperature of about 180°F is needed to cause quick deactivation of the off-flavor, producing enzymes; and a maximum temperature of about 212°F is required to eliminate any toasting of the soybeans.

The use of water in treating the bean is of course necessary to provide the concentrating effort on the protein. The natural soybean contains 20–25% of soluble sugars, and other carbohydrates, which are at present considered to be of no particular value as a food. The water treatment of this process dissolves at least the soluble sugars and minerals and leaches them out from the bean leaving substantially all of the protein and the oil in the bean. By this process, the protein and oil are concentrated and the final product is referred to as a full-fat soy protein concentrate. Very little protein is leached out with this process. This may be because the protein, even though dissolved in water cannot pass through the membranes in the cellular structure of the bean, or it may be that the heat has sufficiently insolubilized the protein that the water cannot remove it from the bean. It should be noted that the starting material in this process is a soybean from which the hull has been removed and the bean has been cracked into two or more pieces. The interior cell structure has not been ruptured and therefore, the water must penetrate the bean through the cell walls and anything which is removed must be removed through the cell walls. It has been found that in the present process, the losses of protein and of oil do not exceed about 5–7% of the former and 1–2% of the latter. It is known, of course, that if the structure of the bean is ruptured, for example, by flaking the present process produces very high losses of both protein and of oil.

The process of this invention provides a different route to products which are eventually produced from soybean material. In the past, if one wished to produce a fat-free soy protein concentrate, the original soybean would be subjected to the process for removing all of the oil, including a solvent extraction step, and thereafter, the remaining product would be concentrated, for example, by treatment with acidified water and subjected to isoelectric precipitation to produce the final soy protein concentrate. Off-flavors are produced in this process because in the process of cracking and flaking the soybean to remove the oil, the enzymes have a better opportunity to react with moisture in the air to produce the off-flavor. Those flavors would then be masked by toasting the material after the oil had been removed. If one wished to make a full-fat soy protein concentrate, the bean would be flaked and toasted and subjected to a water extraction to remove the sugars and other carbohydrates which in turn would concentrate the final product in terms of protein and of oil. The product would be off-color and off-flavor because of the toasting, and the content of protein and oil would be low because of the high losses of protein and oil encountered in such a process. It may be seen that these procedures of the prior art require that a decision be made ahead of time as to the desired final product because the processing was different based upon which product was employed. In the present process, there is only one route to be followed from the original soybean to the full-fat soy protein concentrate which can be used as such or can be subsequently defatted to any desired degree to produce a partially defatted product or a substantially oil-free soy protein concentrate. Such a processing permits the manufacturer to make the intermediate full-fat soy protein concentrate and to store that material for use as the demand requires in a defatting operation or in consumption without further treatment. Obviously, the process of this invention provides a more efficient and desirable method of producing any of the several alternate products from this original material.

Various embodiments of the process of this invention are illustrated in the following examples wherein parts and percentages are by weight and temperatures in degrees Fahrenheit unless otherwise specified. PDI is an abbreviation for Protein Dispersibility Index which is a well-known term in the soybean processing industry describing the fraction of the total protein which can be dispersed in water at the inherent pH of the material being tested. The measurement of PDI is described in AACC Method No. 46-24 in the book "AACC Approved Methods" Revised Edition 1969, published by Amer. Assn. of Cereal Chemists, St. Paul, Minn. It is not intended that this invention will be limited by these examples which are merely illustrative of certain features of the process and products described above.

The following test procedures are employed in the examples for evaluating the products.

TEST - 1

Method for Evaluating Soy Protein Concentrates For Fat Binding In Meatless System A. Ingredients

| | Gm. | % |
|---|---|---|
| 70% Protein Concentrate: | 300 | 17 |
| Solid vegetable shortening | 525 | 30 |
| Salt | 36 | 2 |
| Water and Ice (50:50) | 900 | 51 |
| | 1761 | 100 |

B. Procedure

1. Place water, ice, salt, and concentrate in a Hobart Silent Cutter or equivalent and run until temperature reaches 45°F. (approx. 3–4 min.)
2. Add fat — run cutter until temperature reaches 55°F–58°F. (approx. 3–4 min.)
3. Put mixture into a vacuum mixer for 5 minutes.
4. Fill three 8 oz. cans (3 × 4-4/16 inches) to within ½ inch of top and seal (3 cans.)
5. Retort 3 cans for 70 minutes at 240°F. (10 PSI) then chill at 40°F for 16 hours.

C. Fat Out (Retorted Cans)

1. After the cans have been chilled, open both ends of the can and remove entire sample. Scrape off any fat adhering to the lids or can wall and add to the sample.
2. Place each sample into a tared 400 ml. glass beaker and pour 100 ml. of chloroform over the sample to dissolve all visible fat. One may shorten the time of this step by using a steam bath. The length of time will vary, depending upon the surface fat but is usually less than 15 minutes.
3. Remove the sample from the chloroform and evaporate the solvent on the steam bath or in a low temperature oven.
4. Remove from heat and allow the fat to solidify and weigh.
5. The result is expressed as gm. of unbound fat.

TEST - 2

Method For Determining Water Absorption

A. Procedure

1. Weigh 5 gm. of sample into a 50 ml. centrifuge tube (in duplicate).
2. Add 40 ml. of distilled $H_2O$.
3. Stir until the mixture is homogeneous (usually 1 minute).
4. Centrifuge for 15 minutes at 2000 weigh. RPM.
5. Decant the supernatant into a 50 ml. volumetric flask.
6. Add sufficient water to the flask to make 50 ml. and note the exact volume of water used.

B. Calculation 1. ml. of water absorbed = ml. of water to fill 50 ml. volumetric flask minus 10 ml.
2. % water absorption = ml. water absorbed divided by the sample weight used (5 gm.) times 100.

EXAMPLE 1

1000 g. Of clean dehulled cracked soybeans (DCSB) were added to 10 liters of boiling water and the boiling continued for 35 minutes. Then the liquids were drained and freeze dried and the boiled DCSB were washed with fresh hot water. The washed DCSB was then dried in a forced draft oven at 100°–110°F. until the moisture was about 5–7%. The dried DCSB (full-fat protein concentrate) was then ground, extracted with n-hexane at room temperature, dried at 110°F for 4–6 hours, and desolventized at 190°F. for 1 hour in a forced draft oven (defatted soy protein product). Analysis of the products of the various steps in this process shows the following:

|  | % Moisture | % Protein | % Fat |
|---|---|---|---|
| DCSB Starting Material |  | 41.0 | 20.0 |
| Defatted soy protein concentrate | 4.7 | 67.4 | 0.6 |
| Full-fat protein concentrate | 4.6 | 49.1 | 26.8 |
| Leached solids (freeze dried) | 8.2 | 17.9 | 1.5 |

Calculations based on those data indicate that the protein and oil losses in the process are not more than 8% and 2%, respectively, based on the DCSB. More than 99% of the lipoxidase activity and more than 95% of the trypsin inhibitor are destroyed by the first stage of the process, i.e. from DCSB to full-fat protein concentrate.

EXAMPLE 2

Three different sizes of DCSB were subjected to the process described in Example 1. The three sizes were obtained from the same batch of whole beans so as to eliminate differences due to growing conditions, etc. Analysis of the products showed the following results.

| Size of DCSB Used | Screen Size | Leached Solids | | | |
|---|---|---|---|---|---|
| | | % Yield | % Moisture | % Fat | % Protein |
| Large | −5 | 15.9 | 13.7 | 0.4 | 11.5 |
| Medium | +5–6 | 16.2 | 8.9 | 0.6 | 13.6 |
| Small | +6–10 | 19.1 | 6.6 | 2.0 | 19.6 |

| Size of DCSB Used | Defatted Soy Protein Product | | | | | |
|---|---|---|---|---|---|---|
| | % Moisture | % Fat | % Protein | PDI | %Water Absorption | *Unbound Fat (gm) |
| Large | 2.7 | 0.4 | 68.2 | 9 | 342 | 3.0 |
| Medium | 3.0 | 0.3 | 70.0 | 9 | 348 | 3.0 |
| Small | 3.2 | 0.4 | 70.8 | 10 | 380 | 2.4 |

*The value was 39.3 for a commercial sample of soy protein concentrate — GL-301 of Griffith Laboratories, Inc.

EXAMPLE 3

The process described in Example 1 was repeated, except that whole beans (hull-enclosed), DCSB, toasted DCSB and full-fat flakes were used as the starting materials and that three different boiling periods were used for full-fat flakes. Analysis of the products shows the following:

| Starting Material | Boiling Time (min.) | % Yield | Leached Solids | | | Defatted Soy Protein Products | | |
|---|---|---|---|---|---|---|---|---|
| | | | % Moisture | % Fat | % Protein | % Moisture | % Protein | PDI |
| Whole beans | 35 | 10.0 | 9.2 | 0.2 | 8.5 | 6.2 | 63.1 | 11 |
| DCSB | 35 | 16.0 | 6.7 | 1.5 | 14.7 | 7.0 | 66.9 | 9 |
| Toasted DCSB | 35 | — | 6.4 | 2.3 | 13.5 | 7.2 | 65.7 | 9 |
| Full-Fat Flakes | 20 | 24.4 | 6.9 | 8.3 | 36.2 | 7.2 | 61.5 | 14 |
| '' | 35 | 26.4 | 6.8 | 10.8 | 36.8 | 6.6 | 61.1 | 10 |
| '' | 50 | 25.6 | 4.4 | 8.3 | 39.2 | 6.8 | 61.3 | 8 |

Note 1 — Defatted product from Toasted DCSB was darker in color than product from DCSB
Note 2 — Defatted product from whole beans had higher flatulence than produce from DCSB.

EXAMPLE 4

The comparison described in Example 3 was repeated including defatted flakes as a starting material and employing five different boiling periods for the flake starting materials. In this example, the boiling was accomplished by direct steam injection into the water, and soybean starting material was added to the boiling water. Analysis of the results shows the following:

| Base Material Used | Boiling Time (min.) | Defatted Product % Protein (mfb) |
|---|---|---|
| Whole beans | 35 | 67.5 |
| DCSB | 35 | 71.2 |
| Toasted DCSB | 35 | 70.7 |
| Full-Flat Flakes | 5 | 65.8 |
| '' | 10 | 65.7 |
| '' | 15 | 64.9 |
| '' | 20 | 65.7 |
| '' | 35 | 63.9 |
| Defatted Flakes | 5 | 64.9 |
| '' | 10 | 64.1 |
| '' | 15 | 63.7 |
| '' | 20 | 64.5 |
| '' | 35 | 63.8 |

Note — mfb = moisture-free basis

EXAMPLE 5

The comparison described in Example 3 was repeated using whole beans and DCSB as starting materials, and the process was operated with three different boiling periods employing as the heat source direct steam injection as described in Example 4. Analysis of the results showed the following:

| Starting Material | Boiling Time (min.) | Defatted Product % Protein (mfb) |
|---|---|---|
| DCSB | 20 | 68.4 |
| '' | 35 | 72.1 |
| '' | 50 | 72.8 |
| Whole Beans | 20 | 64.9 |
| '' | 35 | 67.4 |
| '' | 50 | 68.0 |

Note — mfb = moisture-free basis

EXAMPLE 6

The process of Example 3 was employed using three different temperatures to determine the effect on PDI and other characteristics of the product. The results are as follows:

| Temp. | Boiling | % Moisture | %Fat | % Protein | PDI |
|---|---|---|---|---|---|
| 150°F | 35 | 5.5 | 0.4 | 65.5 | 59 |
| 180°F | 35 | 5.4 | 0.4 | 64.7 | 19 |

-continued

| Temp. | Boiling | % Moisture | %Fat | % Protein | PDI |
|---|---|---|---|---|---|
| 212°F | 35 | 5.9 | 0.5 | 68.3 | 11 |

Note 1 — Inactivation of lipoxidase and of trypsin inhibitor was not acceptable in runs at 150°F and 180°F.
Note 2 — On a moisture-free basis the percent protein from the run at 212°F was better than 70%.

EXAMPLE 7

Two batches were processed as follows:
1. DCSB added to boiling water and the boiling continued for 35 minutes.
2. DCSB added to room temperature water and the mixture heated to boiling (which took 25 minutes) and the boiling continued for an additional 35 minutes.

| Batch No. | %Yield | Leached Solids %Moisture | %Fat | %Protein |
|---|---|---|---|---|
| 1 | 19.2 | 6.4 | 2.0 | 15.5 |
| 2 | 20.1 | 5.9 | 1.3 | 20.8 |

| Batch No. | %Moisture | %Fat | Defatted Product %Protein | PDI | %Water Absorption | Unbound Fat (gm) |
|---|---|---|---|---|---|---|
| 1 | 5.2 | 0.5 | 69.0 | 10 | 383 | 5.8 |
| 2 | 5.5 | 0.3 | 67.5 | 15 | 384 | 7.0 |

Note 1 — Unbound fat for commercial soy protein concentrate (GL-301) is 41.0 gm.
Note 2 — A human test panel analysis of products from these two batches showed a significant preference for the taste of the product from Batch No. 1.

EXAMPLE 8

In the following two batches, DCSB used was autoclaved (2–3 lbs. pressure, 25 minutes) and immediately after that, the autoclaved DCSB was dumped into
1. boiling water, or
2. room temperature water In both cases, water was used in the ratio of 10:1 water:solids and no agitation was used during the 60 minutes contact time.

| Batch | %Protein (mfb) in defatted product | PDI, Before Defatting |
|---|---|---|
| 1 | 70.3 | 15 |
| 2 | 67.8 | 42 |

Both samples were off-colored when compared to that from a process in which unautoclaved DCSB was used.

EXAMPLE 9

Three different ratios of water:solids were studied, using DCSB as the base material.

| Batch | Ratio | Leached Solids | %Yield | Defatted Product %Moisture | Protein | PDI |
|---|---|---|---|---|---|---|
| 1 | 5:1 | 14.0 | | 3.7 | 66.4 | 10 |
| 2 | 7.5:1 | 16.4 | | 3.7 | 69.6 | 9 |
| 3 | 10:1 | 17.4 | | 2.8 | 70.6 | 9 |

In all three cases, more than 99% of the lipoxidase activity and more than 95% of the trypsin inhibitor were destroyed. Test panel analysis of flavor found Batch (1) was not as acceptable as (2) or (3).

EXAMPLE 10

In the following three batches the effect of pH was studied. The pH adjustment of water was made when the temperature was about 50°C and then the water was further heated to boiling before DCSB was added.

| Batch | pH of Water | Defatted Product % Moisture | % Fat | % Protein | PDI | % Water Absorption | Unbound Fat (gm) |
|---|---|---|---|---|---|---|---|
| 1 | as-is (8.5) | 8.9 | 0.4 | 65.5 | 10 | 360 | 7.9 |
| 2 | 4.0 | 8.6 | 0.3 | 65.9 | 11 | 358 | 8.6 |
| 3 | 10.0 | 8.8 | 0.3 | 65.8 | 11 | 361 | 7.1 |

EXAMPLE 11

Percent water absorption was compared employing the method of the present invention (room temperature) and the two methods described in U.S. Pat. No. 3,809,767. The products tested were the product of this invention (prepared as described in Example 1) and two commercial soy protein concentrates, each being fat-free and containing approximately 70% protein (moisture-free basis). The results are as follows:

| Sample | Present Method (Room Temp.) | %Water Absorption U.S. 3,809,767 Cold Water 40°F. | Hot Water (155–160°F) |
|---|---|---|---|
| This Invention | 402 | 249 | 251 |
| GL-301 | 448 | 249 | 250 |
| Promosoy 100 | 284 | 182 | 244 |

Note 1 — GL-301 is a product of Griffith Laboratories, Inc.
Note 2 — Promosoy 100 is a product of Central Soya.

I claim:
1. A process for preparing a full-fat soy protein concentrate which is very bland in taste and very light in color and contains substantially all of the original protein content, which comprises the sequential steps of:
   1. adding dehulled, cracked soybeans to water at 180°–212°F and maintaining the soybeans in the water at that temperature for 10–50 minutes,
   2. removing the soybeans from the water,
   3. washing the soybeans in fresh hot water, and
   4. drying the washed soybeans to 8–15% moisture.
2. The process of claim 1 wherein the water temperature of step (1) is about 212°F.
3. The process of claim 1 wherein the dried soybeans of 8–15% moisture content are subsequently subjected to flaking or grinding followed by defatting to produce a product having at least 70% protein on a moisture-free basis.
4. The process of claim 1 wherein the full-fat soy protein concentrate contains 26–27% fat and 51–52% protein on a moisture-free basis, and more than 90% of the trypsin inhibitor in the untreated dehulled, cracked soybeans has been destroyed.
5. The process of claim 1 wherein the the time for maintaining the soybeans in water at 180°–212°F. is 15–40 minutes.

* * * * *